US006213604B1

(12) United States Patent
Valint, Jr. et al.

(10) Patent No.: US 6,213,604 B1
(45) Date of Patent: Apr. 10, 2001

(54) PLASMA SURFACE TREATMENT OF SILICONE HYDROGEL CONTACT LENSES WITH A FLEXIBLE CARBON COATING

(75) Inventors: Paul L. Valint, Jr.; George L. Grobe, III, both of Pittsford; Daniel M. Ammon, Jr., Rochester; Joseph A. McGee, DeWitt, all of NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 09/315,558

(22) Filed: May 20, 1999

(51) Int. Cl.$^7$ .................. G02C 7/04; H05H 1/02
(52) U.S. Cl. .................. 351/177; 351/160 H; 427/574
(58) Field of Search .................. 351/160 R, 160 H, 351/161, 162, 177; 427/574

(56) References Cited

U.S. PATENT DOCUMENTS

| | | | |
|---|---|---|---|
| 3,935,342 | * 1/1976 | Lim | 427/341 |
| 4,055,378 | 10/1977 | Feneberg et al. | 351/160 |
| 4,122,942 | 10/1978 | Wolfson | 206/5.1 |
| 4,143,949 | 3/1979 | Chen | 351/160 |
| 4,214,014 | 7/1980 | Hoffer et al. | 427/40 |
| 4,312,575 | 1/1982 | Peyman et al. | 357/160 |
| 4,632,844 | 12/1986 | Yanagihara et al. | 427/38 |
| 4,980,208 | 12/1990 | Sugiyama et al. | 427/444 |
| 5,326,584 | 7/1994 | Kamel et al. | 427/534 |
| 5,571,882 | * 11/1996 | Vetter | 351/160 H |
| 6,099,122 | * 8/2000 | Chabrecek et al. | 351/177 |

FOREIGN PATENT DOCUMENTS

| | | | |
|---|---|---|---|
| 0 157 212 | 3/1985 | (EP) | C23C/16/26 |
| 0 593 988A1 | 10/1993 | (EP) | B05D/7/24 |
| WO 94/29756 | 12/1994 | (WO) . | |
| WO 95/04609 | 2/1995 | (WO) . | |

OTHER PUBLICATIONS

Patent Abstracts of Japan vol. 013, vol. 013, No. 556 (C–66), Dec. 11, 1989 & JP 01 230777 A (Koujiyundo Kagaku Kenkyusho:KK), Sep. 14, 1989, abstract.

Patent Abstract of Japan vol. 015, No. 449 (P–1275), Nov. 14, 1991 & JP 03 189613A (Hisashi Hosoya; Others: 01), Aug. 19, 1991, abstract.

* cited by examiner

*Primary Examiner*—Scott J. Sugarman
(74) *Attorney, Agent, or Firm*—Robert B. Furr, Jr.

(57) ABSTRACT

The present invention is directed to the surface treatment of silicone hydrogel contact lenses. In particular, the present invention is directed to a method of modifying the surface of a contact lens to increase its hydrophilicity by coating the lens with a carbon-containing layer made from a diolefinic compound having 4 to 8 carbon atoms. In one embodiment, an optically clear, hydrophilic coating is provided upon the surface of a silicone hydrogel lens by sequentially subjecting the surface of the lens to: a plasma oxidation reaction, followed by a plasma polymerization reaction in a the presence of a diolefin in the absence of air. Finally, the resulting carbon layer is rendered hydrophilic by a further plasma oxidation reaction or by the attachment of a hydrophilic polymer chains.

6 Claims, 2 Drawing Sheets

PLASMA SURFACE TREATMENT OF SILICONE HYDROGEL CONTACT LENSES WITH A FLEXIBLE CARBON COATING

FIELD OF THE INVENTION

The present invention is directed to the plasma surface treatment of silicone hydrogel contact lenses. In particular, the present invention is directed to a method of modifying the surface of a contact lens to increase its hydrophilicity by coating the lens with a carbon-containing layer made from a diolefinic compound having 4 to 8 carbon atoms, followed by plasma or chemical treatment of the carbon layer to render it hydrophilic. The present invention is also directed to a contact lens comprising a surface made by such a method.

BACKGROUND

Contact lenses made from silicone materials have been investigated for a number of years. Such materials can generally be subdivided into two major classes, namely hydrogels and non-hydrogels. Non-hydrogels do not absorb appreciable amounts of water; whereas, hydrogels can absorb and retain water in an equilibrium state. Hydrogels generally have a water content greater than about five weight percent and more commonly between about ten to about eighty weight percent. Hydrogel silicone contact lenses tend to have relatively hydrophobic, non-wettable surfaces. Thus, those skilled in the art have long recognized the need for rendering the surface of silicone contact lenses hydrophilic to improve their biocompatibility or wettability by tear fluid in the eye. This in turn is necessary to improve the wear comfort of contact lenses. In the case of continuous-wear lenses, lenses worn both day and night, the comfort of the lens and thus its surface is especially important. Furthermore, the surface of a continuous-wear lens must be designed not only for comfort, but to avoid corneal edema, inflammation and other adverse effects that may be caused by continuous wear of lenses made of unsuitable materials.

Silicone lenses have been subjected to plasma surface treatment to improve their surface properties, e.g., surfaces have been rendered more hydrophilic, deposit resistant, scratch resistant, and the like. Examples of common plasma surface treatments include subjecting the contact-lens surfaces to plasma of: an inert gas or oxygen (see, for example, U.S. Pat. Nos. 4,055,378; 4,122942; and 4,214,014); various hydrocarbon monomers (see, for example, U.S. Pat. No. 4,143,949); and combinations of oxidizing agents and hydrocarbons, e.g., water and ethanol (see, for example, WO 95/04609 and U.S. Pat. No 4,632,844). Sequential plasma surface treatments are also known such as those comprising a first treatment with a plasma of an inert gas or oxygen, followed by a hydrocarbon plasma (see, for example, U.S. Pat. Nos. 4,312,575 and 5,326,584).

U.S. Pat. No. 4,312,575 to Peyman et al. discloses a process for providing a barrier coating on a silicone or polyurethane lens by subjecting the lens to an electrical glow discharge (plasma) process in the presence of a hydrocarbon atmosphere followed by subjecting the lens to oxygen during flow discharge, thereby increasing the hydrophilicity of the lens surface. Peyman et al. teach that the process should be carried out in the absence of oxygen and that alkanes such as methane or butane are preferred. In contrast, U.S. Pat. No. 4,632,844 to Yanagihara teaches plasma treatment of a contact lens with various hydocarbons in the presence of oxygen. Yanagihara includes the use of butadiene (Example 14 and claim 3), but does not specify application to silicone materials in the examples. WO 94/29756 mentions an oxygen/methane/oxygen multi-step process for surface treating an RGP (Rigid Gas Permeable) silicone lens, but does not provide any parameters.

Although such surface treatments have been disclosed for modifying the surface properties of silicone contact lenses, the results have been inconsistent and problematic, in some cases preventing commercialization of high Dk silicone hydrogel lens materials. The coating of such lenses is complicated by the fact that, although silicone hydrogel lenses may be plasma-treated in an unhydrated state, hydrogels subsequently swell when hydrated, unlike their non-hydrogel counterparts. In fact, hydration commonly may cause the lens to swell about ten to about twenty percent in volume, depending upon the water content of the lens. Such swelling of the lens and subsequent autoclaving, a common form of sterilizing lenses, can adversely affect and even remove the desired coating with loss of properties, a phenomenon referred to as delamination.

Thus, it is desired to provide a silicone hydrogel contact lens with an optically clear, hydrophilic coating upon its surface which will withstand subsequent hydration and autoclaving. In the case of a silicone hydrogel lens that is highly permeable to oxygen for continuous wear, it would be highly desirable to form a coating that is water wettable and durable, such that the lens is safe and comfortable to wear, allowing for continuous (night and day) wear of the lens for a week or more without adverse effects to the cornea.

SUMMARY OF THE INVENTION

The present invention is directed toward surface treatment of silicone hydrogel contact lenses. In particular, the present invention is directed to a method of modifying the surface of the contact lens to increase its hydrophilicity by coating the lens with a carbon-containing layer made from a diolefinic compound having 4 to 8. carbon atoms, which layer is subsequently either oxidized by a further plasma treatment to provide nitrogen or oxygen-containing groups on its surface or provided with a secondary coating of a hydrophilic polymer. The present invention is also directed to a contact lens comprising a surface coating made by such a method.

In one embodiment of the invention, the process comprises (1) an initial plasma oxidation with a oxidizing source of atomic oxygen or nitrogen, (2) plasma treatment with a diolefin in the absence of an oxidizing source of oxygen or nitrogen, and (3) subsequent treatment to render the surface wettable by a second plasma oxidation with an oxidizing source of oxygen or nitrogen. By the term "absence" is meant less than ten percent (10%) by weight of oxygen or nitrogen, preferably less than two percent, most preferably zero percent. This results in a flexible coating that does not delaminate from a contact lens and that provides a durable wettable coating for a continuous-wear silcone hydrogel contact lens.

DETAILED DESCRIPTION OF THE INVENTION

Figure 1:
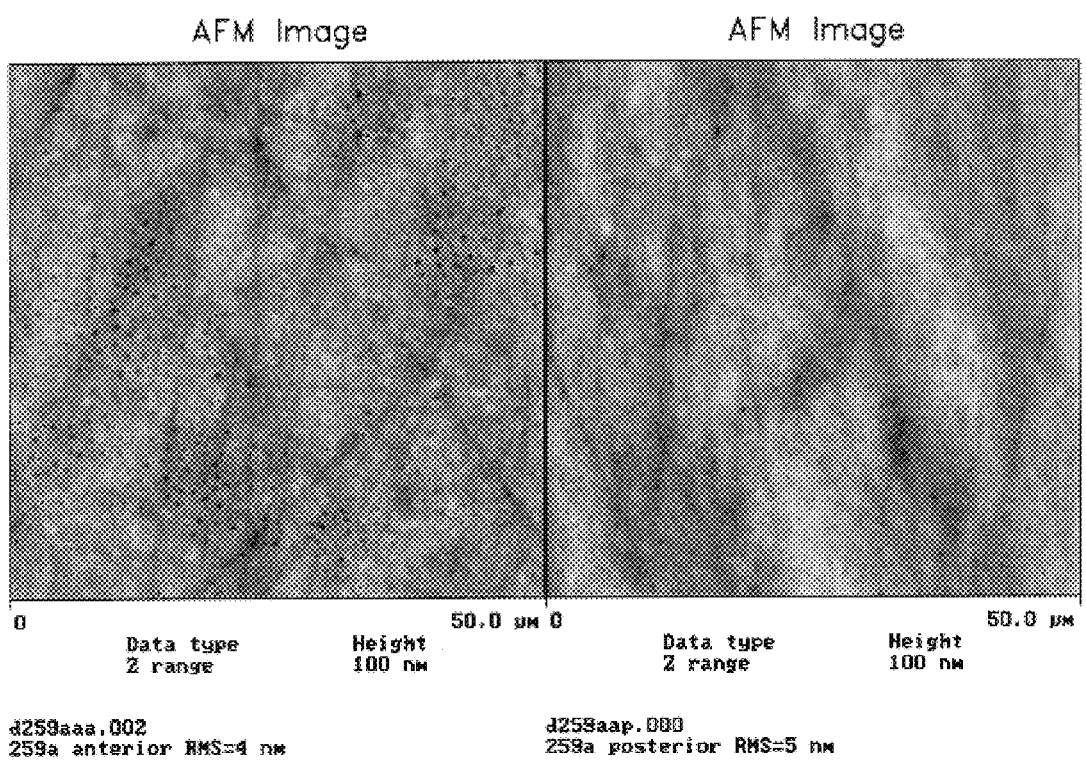
FIG. 1 shows an Atomic Force Microscopy (AFM) topographical images (50 $\mu m^2$) of a control contact lens as described in Example 7 below, for comparison to a contact lens according to the invention; the image of the anterior side of the lens is shown on the left of FIG. 1 and the image of the posterior side is shown on the right.

The subject method utilizes standard plasma oxidation and deposition processes (also referred to as "electrical glow discharge processes") to provide a thin, durable, hydrophilic surface upon a silicone hydrogel contact lens. Although such processes are well known in the art, a brief overview is provided below. Plasma surface treatments involve passing an electrical discharge through a gas at low pressure. The electrical discharge is usually at radio frequency (typically 13.56 MHz), although microwave and other frequencies can be used. The term plasma herein also encompasses corona discharge. The electrical discharge in a plasma is absorbed by atoms and molecules in their gaseous state, thus forming a plasma that interacts with the surface of the contact lens. With an oxidizing plasma, e.g., $O_2$ (oxygen gas), water, hydrogen peroxide, air, etc., ammonia and the like, the plasma tends to etch the surface of the lens, creating radicals and oxidized functional groups. When used as the sole surface treatment, such oxidation renders the surface of a silicone lens more hydrophilic; however, the coverage of such surface treatment may be incomplete and the bulk properties of the silicone material remain apparent at the surface of the lens (e.g., silicone molecular chains adjacent the lens surface are capable of rotating, thus exposing hydrophobic groups to the outer surface). Hydrocarbon plasmas, on the other hand, deposit a thin carbon layer (e.g., from a few Angstroms to several thousand Angstroms thick) upon the surface of the lens, thereby creating a barrier between the underlying silicone materials and the outer lens surface. Following the deposition of a carbon layer on the lens to form a barrier, a further plasma oxidation will render the surface more hydrophilic.

This invention's goal is to provide an improved coating for a hydrogel lens. The method according to the present invention comprises the following steps:

(a) subjecting the surface of the lens to a plasma oxidation reaction to create oxygen or nitrogen containing functional groups on the surface of the lens, in order to promote adhesion of the subsequent carbon coating;

(b) subjecting the oxidized surface of the lens to a plasma polymerization deposition with a gas made from a diolefinic compound having 4 to 8 carbon atoms, in the absence of oxygen, thus forming a carbon layer on the surface on the lens; and (c) rendering the surface of the carbon coating hydrophilic and wettable to tear fluid by either subjecting it to a second plasma oxidation or by applying a secondary coating of a hydrophilic polymer.

Thus, the surface of the hydrogel lens is first subjected to a plasma oxidation, prior to subsequent plasma polymerization to deposit a carbon layer, followed by a final plasma oxidation. The initial plasma oxidation in step (a) prepares the surface of the lens to bind the carbon layer that is subsequently deposited by plasma polymerization on the lens in step (b). This carbon layer or coating provides relatively complete coverage of the underlying silicone material. Step (c) renders the carbon coating of step (b) hydrophilic. Thus, when the lens is ultimately hydrated (wherein the lens typically expands by ten to about twenty percent), the coating remains intact and bound to the lens, providing a durable polymerized hydrocarbon coating which is resistant to delamination and/or cracking.

The initial plasma oxidation of a silicone hydrogel lens may be accomplished in an atmosphere composed of an oxidizing media. The term "oxidizing" or "oxidation" is used herein in its broader sense, not limited to mean combining with oxygen, but to mean combination with electronegative elements in general, inclusive of oxygen, nitrogen, and sulfur. Such an oxidation of the lens may be accomplished in an atmosphere composed of an oxidizing media such as oxygen or nitrogen containing compounds: ammonia, air, water, peroxide, $O_2$ (oxygen gas), methanol, acetone, alkylamines, etc., or appropriate combinations thereof. (It is also possible but more indirect to oxidize the surface by plasma-treatment with an inert gas followed by exposure to an oxidizing atmosphere.) Plasma treatment, when using an electric discharge frequency of 13.56 Mhz, is suitably between about 10 and 1000 watts, preferably 100 to 500 watts, a pressure of about 0.001 to 5.0 torr, preferably 0.1 to 1.0 torr, for a time period of about 10 seconds to 60 minutes, preferably about 1–10 minutes per side if the sides are treated sequentially. It is preferred that a relatively "strong" oxidizing plasma is utilized in the initial oxidation, e.g., employing ambient air drawn through a five percent hydrogen peroxide solution.

After the initial surface treatment, the oxidized lens surface is subjected to a plasma-polymerization reaction in a hydrocarbon atmosphere to form a polymeric (cabonaceous) surface on the lens. The hydrocarbon must be in a gaseous state during polymerization and have a boiling point below about 200° C. at one atmosphere. Diolefins having 4 to 8 carbon atoms, preferably 4 to 6 carbon atoms have been found to be unexpectedly advantageous. Various combinations with lesser amounts of other hydrocarbons may also be used, including both saturated and unsaturated hydrocarbons. As is known in the art, such hydrocarbons may be unsubstituted or substituted so long as they are capable of forming a plasma, and include methane and acetylene. However, it has been found that more flexible coatings are produced by using predominantly diolefins having at least four carbon atoms, e.g., isoprene and 1,3-butadiene. More flexible coatings have been found to be highly desirable or particularly advantageous for "high water" lenses that expand considerably upon hydration.

The hydrocarbon coating can be deposited from plasma, for example, in a low-pressure atmosphere (about 0.001 to 5 torr) at a radio frequency of 13.56 Mhz, at about 10 to 1000 watts, preferably 20–400 watts in about 30 seconds to 10 minutes or more, more preferably 30 seconds to 3 minutes. Other plasma conditions may be suitable as win be understood by the skilled artisan, for example, using pulsed plasma. If the hydrocarbon coating provided is too thick, it can cause a haziness, resulting in a cloudy lens. Furthermore, excessively thick coatings can interfere with lens hydration due to differences in expansion between the lens and the coating, causing the lens to rip apart. Therefore, the thickness of the hydrocarbon layer should be less than about 500 Angstroms, preferably between about 25 and 500 Angstroms, more preferably 50 to 200 Angstroms, as determined by XPS analysis.

Following the deposition of the hydrocarbon layer on the lens, the lens must be rendered wettable. In one embodiment of the invention, the surface is rendered hydrophilic by the attachment of functional groups to the lens, preferably by subjecting the carbon layer to a further plasma-oxidation reaction, thus forming a hydrophilic surface on the lens. The oxidation utilizes a gas composition of an oxidizing media such as air, water, hydrogen peroxide, $O_2$ (oxygen gas), ammonia, alkylamine, and the like, or combinations thereof, although a relatively weak oxidizing media is preferred, e.g., O$_2$ or water. The oxidation of the hydrocarbon layer is performed for a suitable period of time, preferably about 1–10 minutes, typically at a discharge frequency of 13.56 Mhz at 100 to 500 watts and about 0.1–1.0 torr. In another embodiment of the invention, the carbon layer can be rendered hydrophilic by means of a secondary coating of a hydrophilic polymer, either by graft polymerization or by chemical reaction with a preformed polymer having reactive groups along the chain, for example, as disclosed in copending, commonly assigned U.S. patent application Nos. 09/315,912 and 09/315,306 filed concurrently herewith, hereby incorporated by reference in their entirety.

The present invention is especially advantageous for application to silicone hydrogels for continuous wear. Hydrogels are a well-known class of materials that comprise hydrated, cross-linked polymeric systems containing water in an equilibrium state. Such materials are usually prepared by polymerizing a mixture containing at least one silicone-containing monomer and at least one hydrophilic monomer. Either the silicone-containing monomer or the hydrophilic monomer may function as a cross-linking agent (a cross-linker being defined as a monomer having multiple polymerizable functionalities) or a separate cross-linker may be employed. Applicable silicone-containing monomeric units for use in the formation of silicone hydrogels are well known in the art and numerous examples are provided in U.S. Pat. Nos. 4,136,250; 4,153,641; 4,740,533; 5,034,461; 5,070,215; 5,260,000; 5,310,779; and 5,358,995.

Examples of applicable silicon-containing monomeric units include bulky polysiloxanylalkyl (meth)acrylic monomers. An example of bulky polysiloxanylalkyl (meth)acrylic monomers is represented by the following Formula I:

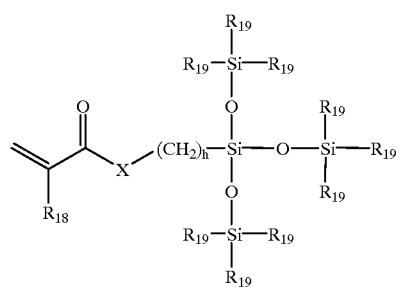

(I)

wherein:

X denotes —O— or —NR—;

each R$_{18}$ independently denotes hydrogen or methyl;

each R$_{18}$ independently denotes a lower alkyl radical, phenyl radical or a group represented by

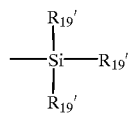

wherein each R$_{19}$ independently denotes a lower alkyl or phenyl radical; and h is 1 to 10.

Some preferred bulky monomers are methacryloxypropyl tris(trimethyl-siloxy)silane or tris(trimethylsiloxy) silylpropyl methacrylate, sometimes referred to as TRIS and tris(trimethylsiloxy)silylpropyl vinyl carbamate, sometimes referred to as TRIS-VC.

Such bulky monomers may be copolymerized with a silicone macromonomer, which is a poly(organosiloxane) capped with an unsaturated group at two or more ends of the molecule. U.S. Pat. No. 4,153,641 to Deichert et al. discloses, for example, various unsaturated groups, including acryloxy or methacryloxy.

Another class of representative silicone-containing monomers includes silicone-containing vinyl carbonate or vinyl carbamate monomers such as: 1,3-bis[4-vinyloxycarbonyloxy)but-1-yl]tetramethyl-disiloxane; 3-(trimethylsilyl)propyl vinyl carbonate; 3-(vinyloxycarbonylthio)propyl-[tris(trimethylsiloxy) silane]; 3-[tris(tri-methylsiloxy)silyl] propyl vinyl carbamate; 3-[tris(trimethylsiloxy)silyl] propyl allyl carbamate; 3-[tris(trimethylsiloxy)silyl]propyl vinyl carbonate; t-butyldimethylsiloxyethyl vinyl carbonate; trimethylsilylethyl vinyl carbonate; and trimethylsilylmethyl vinyl carbonate.

Another class of silicon-containing monomers includes polyurethane-polysiloxane macromonomers (also sometimes referred to as prepolymers), which may have hard-soft-hard blocks like traditional urethane elastomers. Examples of silicone urethanes are disclosed in a variety or publications, including Lai, Yu-Chin, "The Role of Bulky Polysiloxanylalkyl Methacryates in Polyurethane-Polysiloxane Hydrogels," Journal of Applied Polymer Science, Vol. 60, 1193–1199 (1996). PCT Published Application No. WO 96/31792 discloses examples of such monomers, which disclosure is hereby incorporated by reference in its entirety. Further examples of silicone urethane monomers are represented by Formulae II and III:

or

wherein:

D denotes an alkyl diradical, an alkyl cycloalkyl diradical, a cycloalkyl diradical, an aryl diradical or an alkylaryl diradical having 6 to 30 carbon atoms;

G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

a is at least 1;

A denotes a divalent polymeric radical of Formula IV:

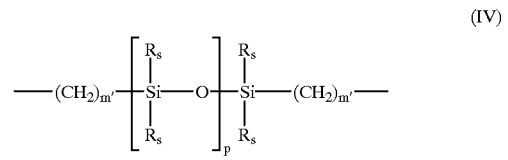

(IV)

wherein:

each Rs independently denotes an alkyl or fluoro-substituted alkyl group having 1 to 10 carbon atoms which may contain ether linkages between carbon atoms;

m' is at least 1; and p is a number that provides a moiety weight of 400 to 10,000;

each of E and E' independently denotes a polymerizable unsaturated organic radical represented by Formula VI:

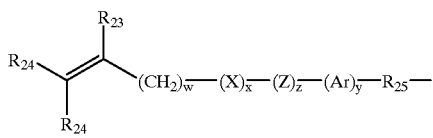

(VI)

wherein:
$R_{23}$ is hydrogen or methyl;
$R_{24}$ is hydrogen, an alkyl radical having 1 to 6 carbon atoms, or a —CO—Y—$R_{26}$ radical wherein Y is —O—, —S— or —NH—;
$R_{25}$ is a divalent alkylene radical having 1 to 10 carbon atoms;
$R_{26}$ is a alkyl radical having 1 to 12 carbon atoms;
X denotes —CO— or —OCO—;
Z denotes —O—or —NH—;
Ar denotes an aromatic radical having 6 to 30 carbon atoms;
w is 0 to 6; x is 0 or 1; y is 0 or 1; and z is 0 or 1.

A preferred silicone-containing urethane monomer is represented by Formula (VII):

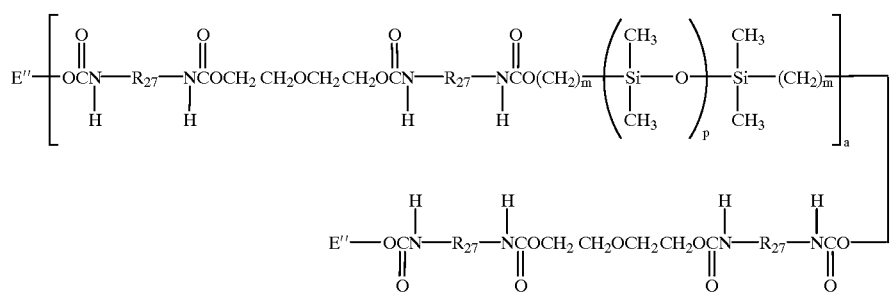

wherein m is at least 1 and is preferably 3 or 4, a is at least 1 and preferably is 1, p is a number which provides a moiety weight of 400 to 10,000 and is preferably at least 30, $R_{27}$ is a diradical of a diisocyanate after removal of the isocyanate group, such as the diradical of isophorone diisocyanate, and each E″ is a group represented by:

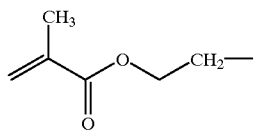

Another class of representative silicone-containing monomers includes fluorinated monomers. Such monomers have been used in the formation of fluorosilicone hydrogels to reduce the accumulation of deposits on contact lenses made therefrom, as described in U.S. Pat. Nos. 4,954,587, 5,079, 319 and 5,010,141. The use of silicone-containing monomers having certain fluorinated side groups, i.e. —(CF$_2$)— H, have been found to improve compatibility between the hydrophilic and silicone-containing monomeric units, as described in U.S. Pat. Nos. 5,387,662 and 5,321,108.

In one preferred embodiment of the invention, a silicone hydrogel material comprises (in bulk, that is, in the monomer mixture that is copolymerized) 5 to 50 percent, preferably 10 to 25, by weight of one or more silicone macromonomers, 5 to 75 percent, preferably 30 to 60 percent, by weight of one or more polysiloxanylalkyl (meth) acrylic monomers, and 10 to 50 percent, preferably 20 to 40 percent, by weight of a hydrophilic monomer. Examples of hydrophilic monomers include, but are not limited to, ethylenically unsaturated lactam-containing monomers such as N-vinyl pyrrolidinone, methacrylic and acrylic acids; acrylic substituted alcohols, such as 2-hydroxyethylmethacrylate and 2-hydroxyethylacrylate and acrylamides, such as methacrylamide and N,N-dimethylacrylamide, vinyl carbonate or vinyl carbarnate monomers such as disclosed in U.S. Pat. Nos. 5,070,215, and oxazolinone monomers such as disclosed in U.S. Pat. No. 4,910,277. Other hydrophilic monomers will be apparent to one skilled in the art.

The above silicone materials are merely exemplary, and other materials for use as substrates that can benefit by being coated according to the present invention have been disclosed in various publications and are being continuously developed for use in contact lenses and other medical devices.

Contact lenses for application of the present invention can be manufactured employing various conventional techniques, to yield a shaped article having the desired posterior and anterior lens surfaces. Spincasting methods are disclosed in U.S. Pat. Nos. 3,408,429 and 3,660,545; preferred static casting methods are disclosed in U.S. Pat. Nos. 4,113,224 and 4,197,266. Curing of the monomeric mixture is often followed by a machining operation in order to provide a contact lens having a desired final configuration. As an example, U.S. Pat. No. 4,555,732 discloses a process in which an excess of a monomeric mixture is cured by spincasting in a mold to form a shaped article having an anterior lens surface and a relatively large thickness. The posterior surface of the cured spincast article is subsequently lathe cut to provide a contact lens having the desired thickness and posterior lens surface. Further machining operations may follow the lathe cutting of the lens surface, for example, edge-finishing operations.

After producing a lens having the desired final shape, it is desirable to remove residual solvent from the lens before edge-finishing operations. This is because, typically, an organic diluent is included in the initial monomeric mixture in order to minimize phase separation of polymerized products produced by polymerization of the monomeric mixture and to lower the glass transition temperature of the reacting polymeric mixture, which allows for a more efficient curing process and ultimately results in a more uniformly polymerized product. Sufficient uniformity of the initial monomeric mixture and the polymerized product are of particular concern for silicone hydrogels, primarily due to the inclusion of silicone-containing monomers which may tend to separate from the hydrophilic comonomer. Suitable organic diluents include, for example, monohydric alcohols, with $C_6$—$C_{10}$ straight-chained aliphatic monohydric alcohols such as n-hexanol and n-nonanol being especially preferred; diols such as ethylene glycol; polyols such as glycerin; ethers such as diethylene glycol monoethyl ether; ketones such as methyl ethyl ketone; esters such as methyl enanthate; and hydrocarbons such as toluene. Preferably, the organic diluent is sufficiently volatile to facilitate its removal from a cured article by evaporation at or near ambient pressure. Generally, the diluent is included at five to sixty percent by weight of the monomeric mixture, with ten to fifty percent by weight being especially preferred.

The cured lens is then subjected to solvent removal, which can be accomplished by evaporation at or near ambient pressure or under vacuum. An elevated temperature can be employed to shorten the time necessary to evaporate the diluent. The time, temperature and pressure conditions for the solvent removal step will vary depending on such factors as the volatility of the diluent and the specific monomeric components, as can be readily determined by one skilled in the art. According to a preferred embodiment, the temperature employed in the removal step is preferably at least 50° C., for example, 60 to 80° C. A series of heating cycles in a linear oven under inert gas or vacuum may be used to optimize the efficiency of the solvent removal. The cured article after the diluent removal step should contain no more than twenty percent by weight of diluent, preferably no more than five percent by weight or less.

Following removal of the organic diluent, the lens is next subjected to mold release and optional machining operations. The machining step includes, for example, buffing or polishing a lens edge and/or surface. Generally, such machining processes may be performed before or after the article is released from a mold part. Preferably, the lens is dry released from the mold by employing vacuum tweezers to lift the lens from the mold, after which the lens is transferred by means of mechanical tweezers to a second set of vacuum tweezers and placed against a rotating surface to smooth the surface or edges. The lens may then be turned over in order to machine the other side of the lens.

Subsequent to the mold release/machining operations, the lens is subjected to surface treatment according to the present invention, as described above, including the plasma polymerization to form a carbon layer and the subsequent attachment of hydrophilic reactive polymer chains.

Plasma treatment involves passing an electrical discharge through a gas at low pressure, preferably at radio frequency (typically, 13.56 MHz). As mentioned above, this electrical discharge is absorbed by atoms and molecules in their gas state, thus forming a plasma that interacts with the surface of the contact lens.

After initiation by a low energy discharge, collisions between energetic free electrons present in the plasma cause the formation of ions, excited molecules, and free-radicals. Such species, once formed, can react with themselves in the gas phase as well as with further ground-state molecules. The plasma treatment may be understood as an energy dependent process involving energetic gas molecules. For chemical reactions to take place at the surface of the lens, one needs the required species (element or molecule) in terms of charge state and particle energy. Radio frequency plasmas generally produce a distribution of energetic species. Typically, the "particle energy" refers to the average of the so-called Boltzman-style distribution of energy for the energetic species. In a low-density plasma, the electron energy distribution can be related by the ratio of the electric field strength sustaining the plasma to the discharge pressure (E/p). The plasma power density P is a function of the wattage, pressure, flow rates of gases, etc., as will be appreciated by the skilled artisan. Background information on plasma technology, hereby incorporated by reference, includes the following: A. T. Bell, Proc. Intl. Conf. Phenom. Ioniz. Gases, "*Chemical Reaction in Nonequilibrium Plasmas*", 19–33 (1977); J. M. Tibbitt, R. Jensen, A. T. Bell, M. Shen, Macromolecules, "*A Model for the Kinetics of Plasma Polymerization*", 3, 648–653 (1977); J. M. Tibbitt, M. Shen, A. T. Bell, J. Macromol. Sci.-Chem., "*Structural Characterization of Plasma-Polymerized Hydrocarbons*", A10, 1623–1648 (1976); C. P. Ho, H. Yasuda, J. Biomed, Mater. Res., "*Ultrathin coating of plasma polymer of methane applied on the surface of silicone contact lenses*", 22, 919–937 (1988); H. Kobayashi, A. T. Bell, M. Shen, Macromolecules, "*Plasma Polymerization of Saturated and Unsaturated Hydrocarbons*", 3, 277–283 (1974); R. Y. Chen, U.S. Pat. No. , 4,143,949, Mar. 13, 1979, "*Process for Putting a Hydrophilic Coating on a Hydrophobic Contact lens*"; and H. Yasuda, H. C. Marsh, M. O. Bumgarner, N. Morosoff, J. of Appl. Poly. Sci., "*Polymerization of Organic Compounds in an Electroless Glow Discharge. VI Acetylene with Unusual Co-monomers*", 19, 2845–2858 (1975).

Based on this previous work in the field of plasma technology, the effects of changing pressure and discharge power on the rate of plasma modification can be understood. The rate generally decreases as the pressure is increased. Thus, as pressure increases the value of E/p, the ratio of the electric field strength sustaining the plasma to the gas pressure decreases and causes a decrease in the average electron energy. The decrease in electron energy in turn causes a reduction in the rate coefficient of all electron-molecule collision processes. A further consequence of an increase in pressure is a decrease in electron density. Providing that the pressure is held constant, there should be a linear relationship between electron density and power.

In practice, contact lenses are surface-treated by placing them, in their unhydrated state, within an electric glow discharge reaction vessel (e.g., a vacuum chamber). Such reaction vessels are commercially available. The lenses may be supported within the vessel on an aluminum tray (which acts as an electrode) or with other support devices designed to adjust the position of the lenses. The use of a specialized support devices which permit the surface treatment of both sides of a lens are known in the art and may be used in the present invention. The Examples below provide the Applicants' best mode for forming the coating on a silicone lens or other medical device.

Subsequent to surface treatment, the lens may be subjected to extraction to remove residuals in the lenses. Generally, in the manufacture of contact lenses, some of the monomer mix is not fully polymerized. The incompletely polymerized material from the polymerization process may affect optical clarity or may be harmful to the eye. Residual material may include solvents not entirely removed by the previous solvent removal operation, unreacted monomers from the monomeric mixture, oligomers present as by-products from the polymerization process, or even additives that may have migrated from the mold used to form the lens.

Conventional methods to extract such residual materials from the polymerized contact lens material include extraction with an alcohol solution for several hours (for extraction of hydrophobic residual material) followed by extraction with water (for extraction of hydrophilic residual material). Thus, some of the alcohol extraction solution remains in the polymeric network of the polymerized contact lens material, and should be extracted from the lens material before the lens may be worn safely and comfortably on the eye. Extraction of the alcohol from the lens can be achieved by employing heated water for several hours. Extraction should be as complete as possible, since incomplete extraction of residual material from lenses may contribute adversely to the useful life of the lens. Also, such residuals may impact lens performance and comfort by interfering with optical clarity or the desired uniform hydrophilicity of the lens surface. It is important that the selected extraction solution in no way adversely affects the optical clarity of the lens. Optical clarity is subjectively understood to be the level of clarity observed when the lens is visually inspected.

Subsequent to extraction, the lens is subjected to hydration in which the lens is fully hydrated with water, buffered saline, or the like. When the lens is ultimately fully hydrated (wherein the lens typically may expand by 10 to about 20 percent or more), the coating remains intact and bound to the lens, providing a durable, hydrophilic coating which has been found to be resistant to delamination.

Following hydration, the lens may undergo cosmetic inspection wherein trained inspectors inspect the contact lenses for clarity and the absence of defects such as holes, particles, bubbles, nicks, tears. Inspection is preferably at 10X magnification. After the lens has passed the steps of cosmetic inspection, the lens is ready for packaging, whether in a vial, plastic blister package, or other container for maintaining the lens in a sterile condition for the consumer. Finally, the packaged lens is subjected to sterilization, which sterilization may be accomplished in a conventional autoclave, preferably under an air pressurization sterilization cycle, sometime referred to as an air-steam mixture cycle, as will be appreciated by the skilled artisan. Preferably the autoclaving is at 100° C. to 200° C. for a period of 10 to 120 minutes. Following sterilization, the lens dimension of the sterilized lenses may be checked prior to storage.

Objects and advantages of this invention are further illustrated by the following examples, but the particular materials and amounts thereof recited in these examples, as well as other conditions and details should not be construed at unduly limit this invention.

EXAMPLE 1

This example discloses a representative silicone hydrogel lens material used in the following Examples. The formulation for the material is provided in Table 1 below.

TABLE 1

| Component | Parts by Weight |
|---|---|
| TRIS-VC | 55 |
| NVP | 30 |
| $V_2D_{25}$ | 15 |
| VINAL | 1 |
| n-nonanol | 15 |
| Darocur | 0.2 |
| tint agent | 0.05 |

The following materials are designated above:
TRIS-VC    tris(trimethylsiloxy)silylpropyl vinyl carbamate
NVP    N-vinyl pyrrolidone
$V_2D_{25}$    a silicone-containing vinyl carbonate as previously described in U.S. Pat. No. 5,534,604.
VINAL    N-vinyloxycarbonyl alanine
Darocur    Darocur-1173, a UV initiator
tint agent    1,4-bis[4-(2-methacryloxyethyl)phenylamino] anthraquinone

EXAMPLE 2

Table 2 below represents a polyurethane silicone hydrogel formulation used in the following examples.

TABLE 2

| Component | Parts by Weight |
|---|---|
| Urethane crosslinking resin | 55 |
| TRIS | 20 |
| DMA | 25 |
| UV Absorber | 0.5 |
| n-Hexanol | 12 |
| Irgacure-819 | 0.5 |
| IMVT | 150 ppm |

The following materials are designated above:
TRIS    tris(trimethylsiloxy)silyipropyl methacrylate
DMA    N,N-dimethylacrylamide
Urethane    a silicone-containing crosslinking resin as previously described in U.S. Pat. No. 5,034,461.
Irgacure-819    a UV initiator
IMVT    a tint agent, namely 1,4-bis[4-(2-methacryloxyethyl)phenylamino] anthraquinone

EXAMPLE 3

Table 3 below represents a polyfumarate silicone hydrogel formulation used to make a lens in the following examples:

TABLE 3

| Component | Parts by Weight |
|---|---|
| $F_2D_{20}$ | 20 |
| TRIS | 40 |
| DMA | 40 |
| n-Hexanol | 5 |
| DAROCUR-1173 | 0.5 |
| IMVT | 150 ppm |

The following materials are designated above:
TRIS    tris(trimethylsiloxy)silyipropyl methacrylate
DMA    N,N-dimethylacrylamide
$F_2D_{20}$    a silicone-containing crosslinking resin as previously described in U.S. Pat. Nos. 5,374,662 and 5,496,871.
Darocur    a UV initiator
IMVT    a tint agent, namely 1,4-bis[4-(2-methacryloxyethyl)phenylamino] anthraquinone

EXAMPLE 4

This Example illustrates a process for the surface modification of a silicone hydrogel lens according to the present invention. The lenses were made from the material (referred to as Balafilcon A) of Example 1 above. Employing this material, a typical process for preparing a contact lens prior to its surface modification according to the present invention is as follows. The silicone hydrogel lenses made of the Balafilcon A formulation were cast-molded from polypropylene molds. Under an inert nitrogen atmosphere, 45-$\mu$l of the formulation was injected onto a clean polypropylene concave mold half and covered with the complementary polypropylene convex mold half The mold halves were compressed at a pressure of 70 psi and the mixture was cured for about 15 minutes in the presence of UV light (6–11 mW/cm$^2$ as measured by a Spectronic UV meter). The mold was exposed to UV light for about 5 additional minutes. The top mold half was removed, and the lenses were maintained at 60° C. for 3 hours in a forced air oven to remove n-nonanol. Subsequently, the lens edges were ball buffed for 10 seconds at 2300 rpm with a force of 60 g. After solvent removal and extraction, the lenses were dried before treatment. The lenses were placed in a Branson RF plasma unit (13.56 MHz) on a tray which elevated the lenses between two electrodes and allowed the flow of gas around the lenses. The plasma unit was evacuated of air until the pressure reached 1.0 torr. Ammonia was introduced into the chamber at 1.0 torr for 1.0 minute, and the plasma was ignited at 100 watts for 20.0 seconds. The flow of ammonia was terminated, and butadiene was introduced at 0.3 torr for 1.0 minute. The butadiene plasma was ignited at 100 watts for 60 seconds. Finally, the butadiene flow was stopped, and ammonia was reintroduced at 1.0 torr for 1.0 minute. Another ammonia plasma was ignited for 20 seconds at 100 watts. (The ammonia and butadiene gases were used as received from Rochester Welding Supply and were 99.9+% pure.) The lenses were then equilibrated in HPLC grade water, heated to 80° C., cooled, placed in buffer borate and autoclaved (1 cycle for 30 minutes at 121° C.).

To illustrate a second set of plasma conditions, in a second run on a larger scale, Balafilcon lenses were placed in a Branson RF plasma unit (13.56 MHz), and the plasma unit was evacuated until the pressure reached 0.2 torr. Ammonia was introduced into the chamber. The plasma was ignited at 450 watts for 60.0 seconds with a flow of 155 sccm. The flow of ammonia was terminated, and butadiene was introduced for 1.0 minute. The butadiene plasma was ignited at 325 watts for 60 seconds with a flow of 200 sccm. Finally, the butadiene flow was stopped and ammonia was reintroduced. Another ammonia plasma was ignited for 60 seconds at 450 watts with a flow rate of 155 sccm. The lenses were then equilibrated in HPLC grade water, heated to 80° C., cooled, placed in borate buffered solution and autoclaved (1 cycle for 30 minutes at 121° C.).

EXAMPLE 5

Lens made from the silicone fumurate material of Example 3 were cast molded from polypropylene molds, and the lenses were analyzed directly from the plasma chamber or after full processing as indicated below. The lenses were pre-extracted prior to plasma treatment, and all fully processed lenses were autoclaved in vials following surface treatment. The plasma chamber was as described above. All lenses were prepumped to a vacuum of at least 0.5 torr prior to any plasma treatment. For comparison, both a methane and a butadiene plasma polymerization was applied to the lenses.

The surface modification consisted of an initial oxidation plasma at 1.0 torr, 200 watts for five minutes in duration in an air/water/peroxide atmosphere (air drawn through a peroxide solution). Subsequently, the hydrocarbon coating was deposited at 150 watts for 5 min at 0.5 torr per side. Subsequent to the carbon coating, the surface was rendered hydrophilic by electrical surface treatment with a manual TANTEC LAB SYSTEM corona system. Samples were corona treated in air at atmospheric pressure. This process utilizes a maximum of 250 watts or a peak electrode voltage of 20,000 volts (AC peak 25 kHz). The corona produced a strong ozone smell. The conditions of the corona were level six with a three second treatment per side. The ½" (1.27 cm) ball electrode was held in the center of the coated lens ¼" (0.635 cm) from the surface. The surface of the polymer was completely water wet (HPLC grade water, 72.4 dynes/cm) after the corona treatment.

Carbon films greater than 100 Angstroms (transparent) thickness were deposited on the lens substrates. This deposition made use of a methane or butadiene gas which was accelerated and forced into the lens surfaces which caused a carbon deposit to form. The idea behind the deposition was to completely cover the substrate such that none of the underlying chemistry is visible over the outermost 100 Angstroms, the sampling depth of the XPS instrument). XPS data was taken on an X-ray Photoelectron Spectrometer (XPS) Physical Electronics [PHI] Model 5600. The instrument had an Apollo workstation with PHI 8503A version 4.0A software. The XPS showed that the silicone hydrogel substrates were coated with the carbon deposited from the plasma reaction. The coatings are primarily aliphatic carbon in composition with little to no oxygen (0.1-2.5% atomic composition). The XPS data for the plasmas employing methane and butadiene is shown in Table 4 below.

TABLE 4

| Description of Process Steps | | Fluorine | Oxygen | Nitrogen | Carbon | Silicon | CHx | C—O | OCO |
|---|---|---|---|---|---|---|---|---|---|
| Control | Average | 0.0 | 17.4 | 5.2 | 65.7 | 11.6 | 65.5 | 27.5 | 6.9 |
|  | STDEV | 0.0 | 0.1 | 0.1 | 0.8 | 0.8 | 0.8 | 1.1 | 0.4 |
| Plasma Oxidation and | Average | 0.0 | 3.1 | 0.0 | 95.2 | 1.6 | 100.0 | 0.0 | 0.0 |
| Methane Plasma | STDEV | 0.0 | 0.6 | 0.0 | 0.6 | 0.3 | 0.0 | 0.0 | 0.0 |
| Plasma Oxidation, | Average | 0.0 | 22.5 | 1.5 | 74.7 | 1.4 | 76.5 | 11.2 | 12.2 |
| Methane Plasma, and | STDEV | 0.0 | 1.9 | 0.6 | 1.3 | 0.6 | 3.7 | 3.0 | 1.1 |
| Corona Oxidation |  |  |  |  |  |  |  |  |  |
| Plasma Oxidation and | Average | 0.0 | 8.7 | 0.6 | 90.7 | 0.1 | 90.6 | 7.8 | 1.6 |
| Butadiene Plasma | STDEV | 0.0 | 0.4 | 0.6 | 0.4 | 0.1 | 0.6 | 0.5 | 0.3 |

The morphology of the substrates was examined by Atomic Force Microscopy (AFM). The images of the methane plasma carbon-coated surface (for comparison to butadiene) appear to be completely coated. The carbon coatings are uniform as examined by Atomic Force Microscopy after deposition and display low roughness values (Root Mean Square roughness on a 50×50 micron scale was 5 nanometers). Many of the features of the original substrate appear to be reproduced in the process of coating with the carbon. The thickness of the film can be varied to any desired value. Coating of carbon up to 0.1 $\mu$m were produced. Increased substrate adhesion was made possible through the use of oxygen plasmas.

It was found that carbon coatings from methane did not expand when placed on the surface of a hydrogel material. The Atomic Force Microscopic (AFM examinations of this surface revealed a cracked surface when expanded in water, saline, borate buffered saline or phosphate buffered saline. However, if the methane gas in the plasma chamber is replaced with 1,3-butadiene, the coating will flex when the hydrogel matrix is expanded in water. The 1,3-butadiene must be expanded in excess of 40% to completely crack and break the coating. This increased flexibility allows the coating to be placed on a dehydrated contact lens and then allows the coating to expand with the substrate matrix, thereby giving a more "robust" surface. The hardness of the coating can be varied via the thickness and the addition of hydrogen, helium to the base plasma gas, to provide the optimal scratch resistance. The coatings were determined to be transparent and to not cosmetically or functionally degrade the performance of the lens when tested in vitro.

EXAMPLE 6

This experiment was designed to study the effect of butadiene coating thickness on surface topography, elemental chemistry, and lens clarity-cloudy ratios. Urethane lenses made from the material of Example 2 and processed and plasma-treated under four different butadiene plasma conditions: 30 seconds, 60 seconds, 90 seconds and 180 seconds.

The urethane lenses were received after solvent removal and extraction and were air-dried before treatment. The lenses were placed in a Branson RF plasma unit (13.56 MHz) on a tray that elevated the lenses between two electrodes and allowed the flow of gas around the lenses. The plasma unit was evacuated of air until the pressure reached 0.15 torr. Ammonia was introduced into the chamber at 0.26 torr, 155 sccm for 1.0 minute, and then the plasma was ignited at 450 watts for 1.0 minute. The flow of ammonia was terminated, and butadiene was introduced at 0.25 torr, 200 sccm for 1.0 minute. The butadiene plasma was ignited at 325 watts for 30 seconds, 60 seconds, 90 seconds, or 180 seconds. Finally, the butadiene flow was stopped, and ammonia was reintroduced at 0.26 torr, 155 sccm for 1.0 minute. Another ammonia plasma was ignited for 1.0 minute at 450 watts. The plasma-coated lenses were placed into a 1.0- percent (w/v) anhydrous acentonitrile and swelled to equilibrium. The lenses were then equilibrated in deionized water and autoclaved (1 cycle for 30 minutes at 121° C.).

Each specimen was analyzed utilizing low-resolution spectra (0–1100 eV) to identify the elements present on the sample surface (10–100 Å). High-resolution spectra were obtained on those elements detected from the low-resolution survey scans. The elemental composition was determined from the high-resolution spectra. The atomic composition was calculated from the areas under the photoelectron peaks after sensitizing those areas with the instrumental transmission function and atomic cross sections for the orbital of interest. Both the anterior and posterior sides of the lenses were tested. The XPS results are shown in Table 5 below:

TABLE 5

| Sample (Treatment Time) | | [C] | [O] | [N] | [Si] | [A]** |
|---|---|---|---|---|---|---|
| Control Anterior | mean | 57.3 | 22.1 | 2.8 | 18.0 | 0 |
|  | Sd* | 0.5 | 0.4 | 0.2 | 0.4 |  |
| Control Posterior | mean | 57.6 | 22.3 | 2.7 | 17.4 | 0 |
|  | Sd* | 0.8 | 1.0 | 0.3 | 0.6 |  |
| 0.5 min Treatment Anterior | Mean | 64.8 | 10.7 | 15.0 | 3.5 | 80 |
|  | Sd | 0.1 | 0.2 | 0.2 | 0.2 |  |
| 0.5 min Treatment Posterior | Mean | 60.8 | 21.1 | 8.6 | 6.9 | 36 |
|  | Sd | 1.6 | 1.2 | 1.1 | 1.5 |  |
| 1.0 min Treatment Anterior | Mean | 73.3 | 8.9 | 15.1 | 2.8 | 82 |
|  | Sd | 2.9 | 1.8 | 1.2 | 1.1 |  |
| 1.0 min Treatment Posterior | Mean | 63.8 | 12.3 | 14.5 | 4.5 | 55 |
|  | Sd | 1.8 | 0.8 | 0.1 | 1.0 |  |
| 1.5 min Treatment | Mean | 74.5 | 7.9 | 17.2 | 0.5 | 74 |
|  | Sd | 0.3 | 0.1 | 0.1 | 0.1 |  |

TABLE 5-continued

| Sample (Treatment Time) | | [C] | [O] | [N] | [Si] | [A]** |
|---|---|---|---|---|---|---|
| Anterior 1.5 min Treatment Posterior | Mean | 76.1 | 7.9 | 13.9 | 2.1 | 65 |
|  | Sd | 0.5 | 0.4 | 0.5 | 0.4 |  |
| 3.0 min Treatment Anterior | Mean | 78.3 | 6.7 | 14.3 | 0.7 | 74 |
|  | Sd | 0.8 | 0.3 | 0.2 | 0.4 |  |
| 3.0 min Treatment Posterior | Mean | 75.0 | 8.5 | 15.0 | 1.6 | 67 |
|  | Sd | 1.4 | 1.0 | 0.8 | 1.0 |  |

*Standard Deviation
**The last column in Table 5 is an estimation of coating thickness based on the carbon 1s electron.

The XPS results revealed that the lenses' coating thickness increased with plasma exposure time, but that the anterior side had a faster deposition rate than the posterior. the lenses were evaluated for clarity/cloudy after each coating condition and all passed except lenses treated for 180 seconds. The differences in deposition rate seen between the anterior and posterior is thought to be due to the flow of gas around the lens geometry (i.e., concave vs. convex) and the resulting pressure differences as it relates to the plasma density. The control, 30 seconds, 1.0 minute and 1.5 minute butadiene plasma-treated lenses had acceptable (3,3) or better clarity-cloudy ratios, while the three-minute plasma-treated lens failed with a 1,1 rating. The clarity/cloudy issues occur when the coating reaches a critical thickness, that when swollen in acetonitrile, the coating becomes extremely wavy and/or the surface becomes rough. Thus, for the same formulation, in this case urethane, as the coating thickness becomes greater, clarity decreased. This critical thickness may be different for every formulation, although there is a trend. The higher the water content of the material; the lower the critical coating thickness. This occurs because higher water content lenses swell larger in acetonitrile, causing the surface to become rougher compared to a lower water content lens with the same coating thickness.

EXAMPLE 7

Fumarate lenses made from the formulation of Example 3 above were received after solvent removal and extraction, dry. The lenses were placed in a Branson RF plasma unit (13.56 MHz) on a tray which elevated the lenses between two electrodes and allowed the flow of gas around the lenses. The plasma unit was evacuated of air until the pressure reached 1.0 torr. Ammonia was introduced into the chamber at 1.0 torr for 1.0 minute, and the plasma was ignited at 100 watts for 20.0 seconds. The flow of ammonia was terminated and butadiene was introduced at 0.3 torr for 1.0 minute. The butadiene plasma was ignited at 100 watts for 30 seconds. Finally, the butadiene flow was stopped and ammonia was reintroduced at 1.0 torr for 1.0 minute. Another ammonia plasma was ignited for 20 seconds at 100 watts. The lenses were then equilibrated in HPLC grade water, heated to 80° C., cooled, placed in Buffered Borate Solution and autoclaved (1 cycle for 30 minutes at 121° C.). The lenses were analyzed by Photoelectron Spectroscopy (XPS). The control lens was received dry after wet processing. There was no further processing done to the lens. The low resolution spectra for the Control lens detected carbon, oxygen, silicon and nitrogen. There was 65.8% +/−0.3 carbon, 17.7% +/−0.2 oxygen, 5.7% +/−0.6 nitrogen, and 10.8% +/−0.3 silicon at the surface. The results are shown in Table 6 below.

TABLE 6

|  |  | [C] | [O] | [N] | [F] | [Si] | [Na] |
|---|---|---|---|---|---|---|---|
| Control | mean | 65.8 | 17.7 | 5.7 | 0.0 | 10.8 | 0.0 |
|  | SD | 0.3 | 0.2 | 0.6 | 0.0 | 0.3 | 0.0 |

The lenses were then ammonia plasma-treated for 20.0 seconds, at 100 watts and 1.0 torr. The low resolution XPS spectra detected carbon, oxygen, silicon and nitrogen. There was 62.0% +/−1.1 carbon, 18.8% +/−0.7 oxygen, 9.0% +/−0.8 nitrogen and 10.2% +/−0.8 silicon at the surface. Compared to the control, the nitrogen and oxygen levels increased, carbon decreased and silicon remained the same. The results are shown in Table 7 below.

TABLE 7

|  |  | [C] | [O] | [N] | [F] | [Si] | [Na] |
|---|---|---|---|---|---|---|---|
| Ammonia Plasma Treated | mean | 62.0 | 18.8 | 9.0 | 0.0 | 10.2 | 0.0 |
|  | SD | 1.1 | 0.7 | 0.8 | 0.0 | 0.8 | 0.0 |

The ammonia/butadiene/ammonia plasma treated fumarate lens was analyzed by XPS. There was no further processing of the lenses. The low resolution spectra detected carbon, oxygen, silicon and nitrogen. There was 78.2% +/−2.3 carbon, 7.8% +/−1.6 oxygen, 11.5% +/−1.4 nitrogen and 2.7% +/−1.5 silicon at the surface. XPS data showed a decrease in silicon and an increase in nitrogen and carbon which indicated a nitrogen/carbon containing coating had been applied to the surface of the silicon fumarate substrate. The detection of 2.7% silicon puts the carbon layer thickness between 5 and 6 nm as long as the silicon was being detected from the underlying surface. The XPS results for the ammonia/butadiene/ammonia plasma treated fumarate lens is shown in Table 8 below.

TABLE 8

|  |  | [C] | [O] | [N] | [F] | [Si] | [Na] |
|---|---|---|---|---|---|---|---|
| Carbon/NH3 Plasma | Mean | 78.2 | 7.8 | 11.5 | 0.0 | 2.7 | 0.0 |
|  | SD | 2.3 | 1.6 | 1.4 | 0.0 | 1.5 | 0.0 |

Figure 2:
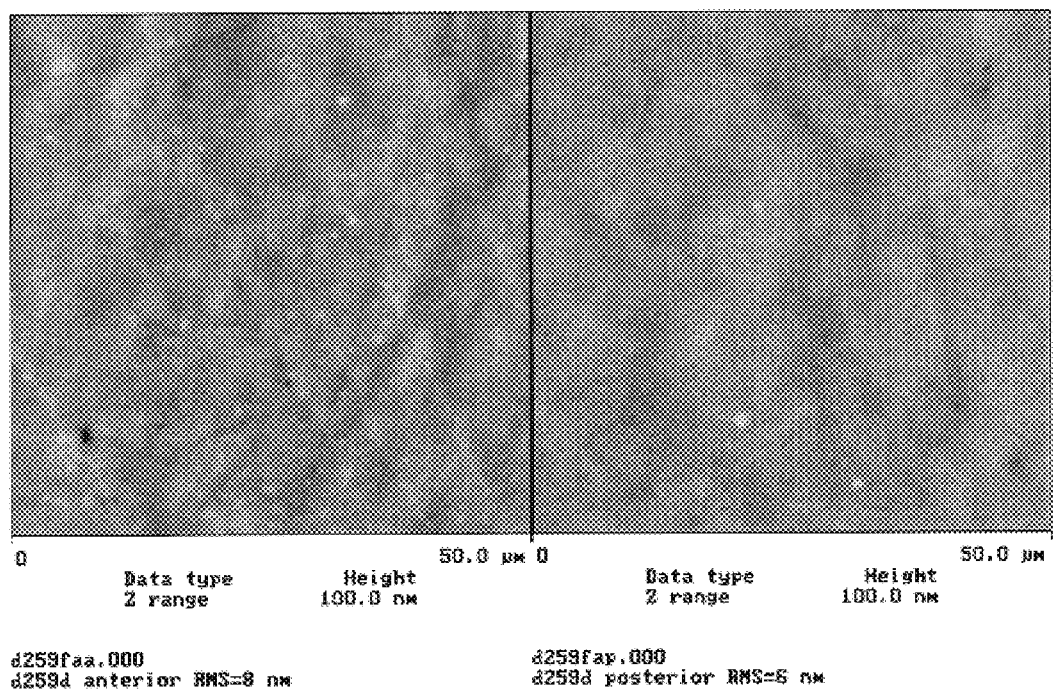
FIG. 2 shows an Atomic Force Microscopy (AFM) topographical images (50 $\mu m^2$) of a contact lens coated as described in Example 7 according to one embodiment of the present invention, which lens is a fumarate silicone hydrogel lens plasma polymerized with butadiene followed by a plasma oxidation with ammonia.

AFM topographical images of a control lens is shown in FIG. 1. This control lens was received dry after wet processing, and analyzed as received. The Atomic Force Microscopy (AFM) images were 50 $\mu m^2$ with the anterior (side of the lens) shown on the left and the posterior shown on the right. The lens surface topography of both surfaces showed lines replicated from the tool employed (the lines from the tool make the molds which make the lenses). The anterior also had pits, which may be from the tool or air bubbles caught in the monomer mix. The Root Mean Square (RMS) roughness of the anterior lens surface was 4.1 nm +/−0.1, and the posterior had an RMS roughness of 4.7 nm +/−0.3. Typical cast mold lenses have an RMS roughness of from 2–25 nm. The AFM images of a hydrophilc-polymer coated fumarate (an ammonia, butadiene, and ammonia plasma-treated fumarate lens soaked in a hydrophilic polymer), fully processed, is shown in FIG. 2. The hydrophilic polymer is made from dimethyl acrylamide (DMA) and vinyl-4,4-dimethyl-2-oxazolin-5-one (VDMO) (80%/20). The AFM images were again 50 $\mu$m with the anterior on the left and the posterior on the right. The images were taken towards the center of the lens. The topography looks like a control lens with a few features revealing a coating, and a stress/ stretch feature with light vermiculation (wave-like surface with a 0.25–0.50 $\mu$m wavelength). As the coating becomes thicker, towards the edge, a heavier vermiculated topography appears. This vermiculated topography results from the carbon coating expanding in the acetonitrile solvent. The Root Mean Square (RMS) roughness of the anterior lens surface was 8.0 nm +/−3.4, and of the posterior surface was 5.3 nm +/−2.2, less than 25 nm as desired.

EXAMPLE 8

This example illustrates a surface modification of a contact lens according to the present invention employing examples of monomer mixtures for graft polymerization to provide a secondary coating of a hydrophilic polymer. The lenses of Example 3 (silicone fumurate, 36% water upon hydration) were analyzed directly from the plasma chamber and after full processing as indicated below. All fully processed lenses were autoclaved in vials. Solution A, comprising N,N-dimethylacrylamide (DMA), was prepared by dissolving 3 grams of distilled DMA in 300 ml of purified water. Solution B was prepared by dissolving 2 g of DMA and 0.01 g of ethyleneglycol dimethacrylate (EGDMA) in 200 ml of purified water. Solution C was prepared by dissolving 1 g DMA and 0.3 g of SPE (the sulfobetain N,N-dimethyl-methacryloxyethyl-N-(3-sulfopropyl)-ammonium betain) in 100 ml of purified water. A solution of Vazo 64 0.2 percent (weight/volume, hereafter w/v) in ethanol was prepared and 200 $\mu$l was added to each lens vial. The redox catalyst pair was a 10 % (w/v) solution of ammonium persulfate and a 5% (v/v) solution of tetramethylenediamine. A 50 $\mu$l portion of each solution was added to each lens sample. All treatments were carried out overnight. Sample vials were opened and the treatment solutions were replaced with Borate Buffered Saline followed by one autoclave cycle.

Table 9 below gives sample numbers, corresponding treatments, and XPS data. Ten lenses were treated in each case. The lenses were extracted and dried prior to any treatment.

TABLE 9

| Sample Number | Plasma Treatment | Post Treatment | Catalyst | Temp. | Side (A or P) | O1s | N1s | C1s | Si2p | Na1s |
|---|---|---|---|---|---|---|---|---|---|---|
| 1 | NH2/Butadiene | DMA | None | 80° C. | A | 18 | 6.8 | 70.7 | 4.5 | 0 |
| 2 | NH2/Butadiene | DMA | None | 80° C. | A | 15.6 | 5.1 | 72.8 | 6.5 | 0.1 |
| 3 | NH2/Butadiene | DMA | None | 80° C. | P | 18.2 | 6.6 | 67.9 | 7 | 0 |
| 4 | NH2/Butadiene/O2 | DMA | None | 80° C. | A | 16.7 | 3.9 | 73.9 | 5.5 | 0 |
| 5 | NH2/Butadiene/O2 | DMA | None | 80° C. | A | 19.6 | 4.5 | 66 | 9.8 | 0.1 |
| 6 | NH2/Butadiene/O2 | DMA | None | 80° C. | P | 32.9 | 6.9 | 50.6 | 4.6 | 2.6 |

TABLE 9-continued

| Sample Number | Plasma Treatment | Post Treatment | Catalyst | Temp. | Side (A or P) | O1s | N1s | C1s | Si2p | Na1s |
|---|---|---|---|---|---|---|---|---|---|---|
| 7 | NH2/Butadiene/O2 | DMA/EGDMA | None | 80° C. | A | 15.7 | 4.7 | 73.3 | 6.1 | 0.1 |
| 8 | NH2/Butadiene/O2 | DMA/EGDMA | None | 80° C. | A | 16.3 | 4.6 | 75 | 4 | 0 |
| 9 | NH2/Butadiene/O2 | DMA/EGDMA | None | 80° C. | P | 15.5 | 4.1 | 75.9 | 4.6 | 0.2 |
| 10 | NH2/Butadiene | DMA | Vazo 64 | 80° C. | A | 17.4 | 5.8 | 71.9 | 4.8 | 0.2 |
| 11 | NH2/Butadiene | DMA | Vazo 64 | 80° C. | A | 20.7 | 6.1 | 64.9 | 8.2 | 0.1 |
| 12 | NH2/Butadiene | DMA | Vazo 64 | 80° C. | P | 21.5 | 6.5 | 62.2 | 9.6 | 0.2 |
| 13 | NH2/Butadiene | DMA | Redox | R.T. | A | 14.5 | 7.1 | 77.3 | 0.9 | 0.2 |
| 14 | NH2/Butadiene | DMA | Redox | R.T. | A | 15.8 | 7.7 | 74.6 | 1.4 | 0.5 |
| 15 | NH2/Butadiene | DMA | Redox | R.T. | P | 16.7 | 5.5 | 70.5 | 7.3 | 0.1 |
| 16 | NH2/Butadiene | DMA/EGDMA | Redox | R.T. | A | 15.3 | 7.8 | 74 | 2.7 | 0.1 |
| 17 | NH2/Butadiene | DMA/EGDMA | Redox | R.T. | A | 18.5 | 7.6 | 71 | 2.1 | 0.9 |
| 18 | NH2/Butadiene | DMA/EGDMA | Redox | R.T. | P | 16.3 | 5.8 | 71.5 | 6.4 | 0 |
| 19 | NH2/Butadiene | DMA/SPE | Redox | R.T. | A | 18.9 | 7.2 | 69.8 | 3.5 | 0.1 |
| 20 | NH2/Butadiene | DMA/SPE | Redox | R.T. | A | 17.2 | 7.2 | 70.1 | 5.4 | 0.2 |
| 21 | NH2/Butadiene | DMA/SPE | Redox | R.T. | P | 18 | 5.4 | 68.1 | 8.2 | 0.2 |
| AA | NH2/Butadiene | None | None | R.T. | A (mean) | 4.86 | 1 | 93.1 | 1 | na |
| AB | NH2/Butadiene | None | None | R.T. | P (mean) | 8.42 | 2.2 | 84.7 | 4.7 | na |
| BA | NH2/Butadiene/O2 | None | None | R.T. | A (mean) | 19 | 3.4 | 74 | 3.3 | na |
| BB | NH2/Butadiene/O2 | None | None | R.T. | P (mean) | 23.1 | 4.9 | 66.1 | 4.8 | na |

Many other modifications and variations of the present invention are possible in light of the teachings herein. It is therefore understood that, within the scope of the claims, the present invention can be practiced other than as herein specifically described.

What is claimed is:

1. A method for treating the surface of a silicone hydrogel contact lens, which method comprises the sequential steps of:

(a) subjecting the surface of the lens to a plasma oxidation reaction;

(b) subjecting the oxidized surface of the lens to a plasma polymerization reaction in a hydrocarbon atmosphere comprising a diolefin having four to eight carbon atoms in the effective absence of oxygen, to form a carbon layer having a thickness of at least 50 to 500 Angstroms; and (c) rendering the carbon layer of step (b) hydrophilic by either subjecting the surface to a plasma oxidization or by a secondary coating of a hydrophilic polymer.

2. The method of claim 1, wherein the lens surface of step (b) is subjected to a plasma oxidation with an oxidizing source of oxygen or nitrogen to form a hydrophilic surface by creating hydrophilic functional groups on the surface of the carbon layer.

3. The method of claim 1, wherein the lens surface of step (b) is coated with hydrophilic polymeric chains either by a free-radical graph polymerization or by the attachment of preformed polymers containing a reactive group that bonds to complementary reactive groups on the suface of the lens.

4. The method of claim 1, wherein the plasma oxidation in step (b) is carried out at 10 to 1000 watts for a period of 10 seconds to 10 minutes, at a pressure of 0.001 to 1.0 torr.

5. The method of claim 1, wherein the oxidation reaction of steps (a) and (c) are independently conducted in an oxygen or nitrogen containing atmosphere selected from at least one of ambient air, oxygen gas, hydrogen peroxide, ammonia, water, and combinations thereof.

6. The method of claim 1, wherein the plasma polymerization reaction of step (b) is conducted in an atmosphere comprising isoprene and/or 1,3-butadiene.

* * * * *